Jan. 26, 1965     H. W. LANGE     3,166,953
POWER TRANSMISSION MECHANISM
Filed Aug. 3, 1962     2 Sheets-Sheet 1
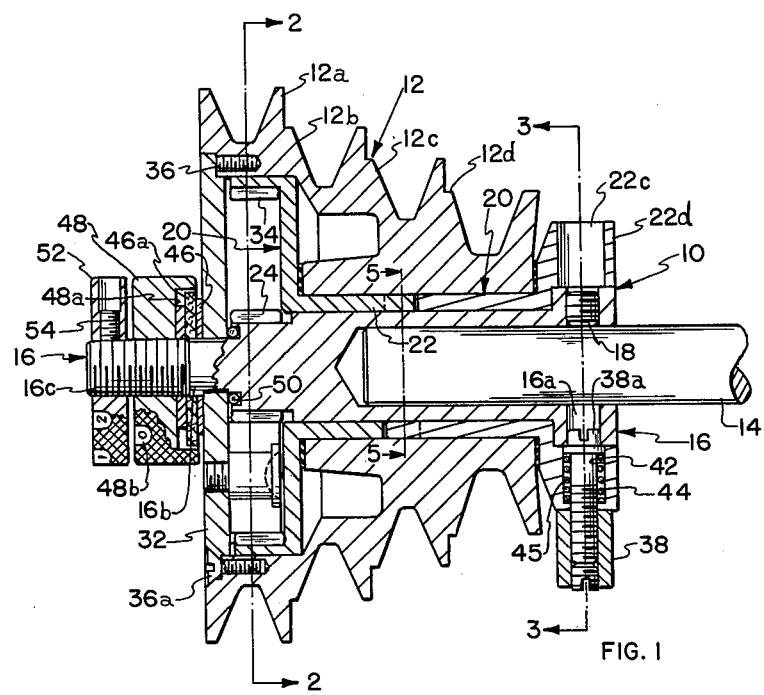
FIG. 1
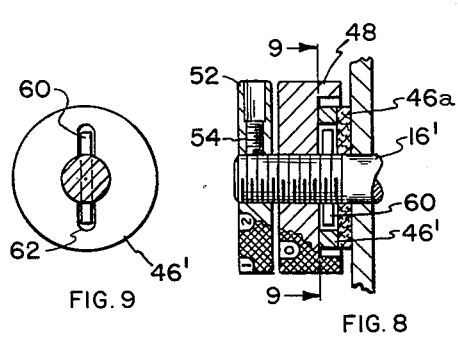
FIG. 9
FIG. 8
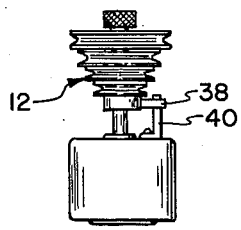
FIG. 7
INVENTOR.
HENRY W. LANGE
BY *Mason, McGlew and Toren*
ATTORNEYS Jan. 26, 1965

H. W. LANGE 3,166,953

POWER TRANSMISSION MECHANISM

Filed Aug. 3, 1962

INVENTOR.
HENRY W. LANGE

BY *Marco, McGlew and Toren*

ATTORNEYS

3,166,953
POWER TRANSMISSION MECHANISM
Henry W. Lange, 15 S. Irving St., Ridgewood, N.J.
Filed Aug. 3, 1962, Ser. No. 214,717
11 Claims. (Cl. 74—785)

This invention relates in general to a power transmission mechanism and in particular to a new and useful mechanism for transmitting variable power and torque to a pulley set.

The invention is particularly applicable for the transmission of power from small electric motors and the like to power tools such as drill presses, for example. According to the present invention mechanisms have been employed permitting driving through an electric motor and a pulley set to operate various small tools such as would be found in a work shop. With devices of this sort attempts have been made to incorporate gearings in the drive to the pulley set, so that a change in the mechanical advantage and power requirements may be effected in addition to the power changes which may be achieved by varying the pulley of each set location upon which the belt is located. However, the gearing employed usually included long extension arms or bulky anchoring means to provide for the variation between driving through the gearings or direct drive.

In accordance with the present invention there is provided an improved transmission mechanism for incorporation with a pulley set which includes a shaft arrangement with planetary gearing adapted to be incorporated in the interior of a pulley set and with an improved control arrangement for providing either direct drive or driving through the gearing. In addition, the mechanism further includes means for controlling the torque which is transmitted from the driving shaft to the pulleys by variable torque adjustment means incorporated in the transmission. A feature of the invention is that the parts are very simply constructed and that the means for controlling the driving arrangement is simple. In addition, the torque which is transmitted from the driving shaft to the pulleys may be easily adjusted through a wide range. By controlling the torque it is possible to insure that the power which is transmitted through the pulley set will not be at a value at which the tools which are operated thereby will be damaged.

The mechanism thus provides an excellent means for easy incorporation in the driving mechanism of a power tool driving arrangement which includes means for effecting driving through a gearing for obtaining a large mechanical advantage and a slow rotation speed and also for easily and simply adjusting the torque by means of an adjustable clutching mechanism mounted directly adjacent the transmission.

A further feature is that the driving mechanism is arranged so that rotation of the pulleys will always be in the same sense as the rotation of the driving shaft.

In accordance with a preferred arrangement of the invention an internal annular gear member is provided with a central hub portion or sleeve extension which is adapted to fit over the driving shaft connected to a motor. The internal annular gear may be held against rotation with the driving shaft and the pulley set driven by means of a central gear affixed to the driving shaft through planetary gears rotatably held on an end plate which is advantageously affixed directly to the largest pulley of a pulley set. The arrangement includes novel means for anchoring the hub portion of the annular gear at a location directly adjacent the motor to which the driving shaft is connected by means of an adjustable collar member formed as an extension of the hub portion of the gear and which may be set to anchor the annular gear against rotation. When the sleeve and the annular gear is thus anchored so that it does not rotate with the driving shaft, the drive from the power shaft is through the gearing to the pulleys. The arrangement for anchoring the annular gear so that it does not rotate with the shaft includes a radial bore in the collar member which carries a retractable pin. The pin is biased into a radial bore of the driving shaft when direct drive is effected, whereby it keys or locks the annular gear with the driving shaft. The pin may be retracted against the biasing spring force and locked in an extended position for contact by a holding bracket. In this latter instance the gear will not rotate with the shaft and the drive will be through the planetary gearing to effect rotation of the pulleys at high mechanical advantage and slow speed.

In accordance with a further feature of the invention, the end plate which contains the planetary gear is arranged in connection with an adjustable clutching means for varying the torque which may be transmitted from the power shaft to the pulley. This torque adjustment is made advantageously in accordance with the invention by means of an adjustable nut member which is made to bear against a friction washer to urge the washer against the plate and hence adjust the driving torque through the plate to the pulley set from the driving shaft. Depending upon the amount of tightening of this nut element, the torque may be instantaneously varied and means are provided for indicating the relative amount of such adjustment so that the torque value which is transmitted may be easily controlled.

Accordingly, it is an object of this invention to provide an improved power transmission mechanism.

A further object of the invention is to provide a power transmission mechanism particularly for pulley sets in which the transmission mechanism includes gearing arranged within the interior of the pulley set and comprises a planetary gear system including an annular gear which may be advantageously anchored against rotation for driving through the gearing sets by anchoring means located adjacent the smallest pulley of the pulley set.

A further object of the invention is to provide a power transmission for a pulley set which includes gearing arranged within the pulley set and improved control means for regulating whether the drive is directed through the gearing or directly to the pulley set.

A further object of the invention is to provide a power transmission for a pulley set and the like which includes a driving shaft rotatably mounted in a plate member and including a torque adjusting mechanism comprising a nut threaded on the end of the shaft and arranged to bear against friction washer means disposed between the nut and the plate.

A further object of the invention is to provide an improved mechanism for employment with power transmission devices such as a pulley set which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a transverse section through a pulley set having a power transmission and a torque control therein constructed in accordance with the invention;

FIG. 7 is a side elevation of a motor and pulley driving set indicated on a reduced scale;

FIG. 8 is a partial longitudinal section of another embodiment of the invention showing a variation in the construction of the anchoring washer; and FIG. 9 is a fragmentary side elevation of the embodiment indicated in FIG. 8.

Figure 2:
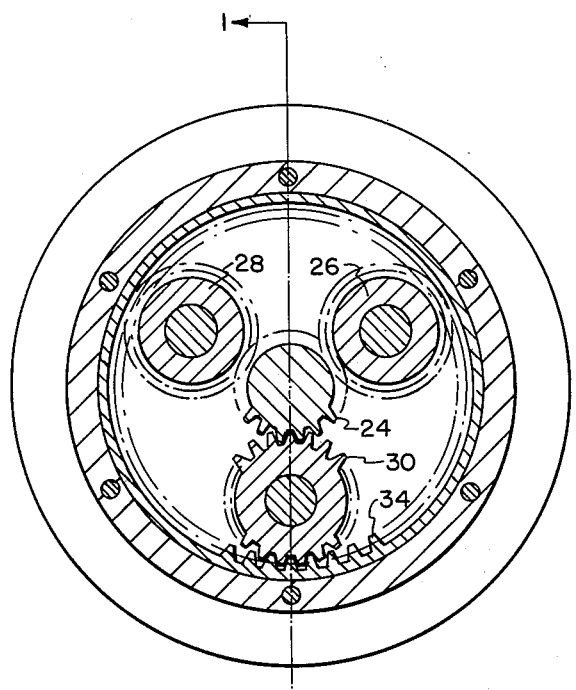
FIG. 2 is a section taken on the line 2—2 of FIG. 1.

Referring to the drawings in particular, the invention embodied therein includes a transmission mechanism generally designated 10 adapted to be employed with a pulley set generally designated 12 for the purposes of varying the power and torque transmitted thereto. In the embodiment illustrated a motor driving shaft 14 is adapted to be connected to the power transmission mechanism 10 which advantageously is arranged within the hollow interior of the pulley set 12.

Figures 5, 6:
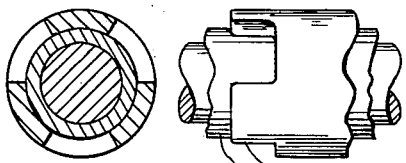
FIG. 5 is a section taken on the line 5—5 of FIG. 1.
FIG. 6 is a partial side elevation of the coupling sleeve element, as shown in FIG. 5.

In accordance with the invention the transmission mechanism includes a shaft extension element or shaft member generally designated 16 which is hollowed at a rear portion to accommodate the shaft 14. The member 16 is affixed to the shaft 14 for rotation therewith by means of a set screw 18. In accordance with the invention an annular gear member generally designated 20 is provided with an annular hub portion 22 which is adapted to fit over the shaft extension 16. The hub portion 22 is advantageously made in two coupling sleeve elements or pieces having interengaging projections and recesses 22a and 22b (FIG. 6) in order to facilitate easy assembly and disassembly of the parts. A rear portion 22d advantageously includes a radially widened oblong portion having a bore 22c which aligns with the bore in the shaft extension member 16 for receiving the set screw 18. The set screw 18 is therefore adjusted in respect to the shaft 14 through the bore 22c.

The shaft extension member 16 includes an intermediate portion formed as a gear having gear teeth 24 which mesh with gear teeth formed on planetary gears 26, 28 and 30 (FIGS. 1 and 2) which are rotatably mounted on an end plate 32. The planetary gears 26, 28 and 30 are arranged to project from the plate 32 within the annular gear member 20 and mesh with teeth 34 defined in the interior of the annular gear member 20. In the arrangement indicated a prime number gear teeth is employed which, in the embodiment shown, includes 19 teeth on the gear 24, 23 teeth on each of the planetary gears 26, 28 and 30, and 65 teeth around the interior of the annular gear 20.

As indicated in the drawings, a feature of the invention is that the transmission mechanism is advantageously easily includable in the interior of the pulley set 12 by mounting the plate member 32 to a large diameter pulley 12a of the pulley set 12 by means of set screws 36. The set screws include heads 36a which overlap outer portions of both the pulley 12a and the plate 32 so as to key these parts together. The pulley set 12 also includes pulleys 12b, 12c and 12d ranging in size downwardly from 12a to 12d.

With the transmission mechanism just described it is possible to drive from the shaft 14 directly to the pulley set 12 via the sleeve 22 and the plate 32 without the mechanical advantage of the planetary gear set by keying the sleeve portion 22 of the annular gear 20 directly to the shaft. Means are provided either to key the sleeve to the shaft 14 for rotation therewith or to anchor the annular gear member 20 against rotation with the shaft.

Figure 3:
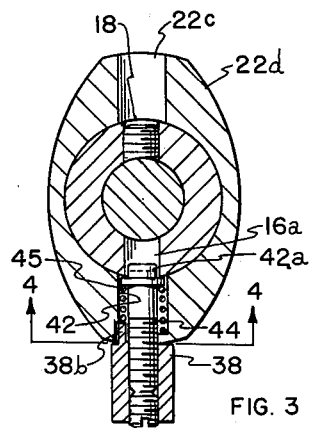
FIG. 3 is a section taken on the line 3—3 of FIG. 1.
Figure 4:
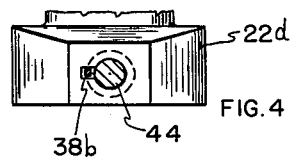
FIG. 4 is a section taken on the line 4—4 of FIG. 3.

In accordance with the invention such means includes an anchoring nut or stop 38 which projects from the collar portion 22a adjacent the smaller diameter pulley 12d out of the way of the operating mechanism. When extended, the nut 38 may be held against rotation by means of a bracket 40 (FIG. 7) against which the nut 38 is made to abut when driving through the gears, if desired. The nut 38 is radially displaceable in bore 22c on the part 22d of sleeve 22. The nut 38 is secured to a bolt element 42 which is held captive in the part 22d in a bore 44 defined therein. A compression spring 45 urges nut 38 and bolt 44 outwardly. In the position indicated in FIG. 3 the nut 38 is oriented so that it is retracted and a projection 38a thereof fits into an opening or bore 16a defined in the shaft extension 16 and keys the collar 22d and sleeve with the annular gear 34 to the shaft 14. When the nut 38 is pulled out it may be rotated so that a pin portion 38b rests on a shoulder of the collar 22d in a projecting position to hold the sleeve 22 and annular gear 20 against rotation with the shaft extension 16 when the nut 38 abuts against the stop 40. The annular gear 20 is thus prevented from rotating relatively to the shaft 14. When this occurs the drive from the shaft 14 through the shaft extension 16 is through the gears 24, 26, 28 and 30 rotating around the annular gear 20. Planetary gears 26, 28 and 30, being affixed to the plate 32, transmit a drive through the plate to the pulley set 12 at a slower speed but with higher mechanical advantage.

In accordance with a further feature of the invention the shaft extension 16 is advantageously made with a projection 16b which projects beyond plate 32 and over which is fitted one or more friction washers 46 and one or more anchoring washers 46a which have squared openings which fit over a squared portion of the projection to confine the washers against rotative movement around the shaft extension 16b. The shaft 16 is also provided with an outer end 16c which projects beyond the plate 32 which is threaded to receive a torque adjustment nut 48 which is threadably engaged thereon. Nut 48 may be rotated on the threads of shaft 16 to cause an inner face 48a to bear against the friction washers 46 and to increase or decrease the driving torque through the plate 32 as desired. An advantage of the anchoring washers 46a is that when the nut 48 is tightened, there is no tendency to have the washers advance axially along the draft and cause a binding or throwing out of the nut 48. It has been found advantageous to include a set of roller bearings 50 in an annular groove defined at the interior end surface of the gear 24. When the torque control nut 48 is tightened, the degree of tightening will adjust the torque which is transmitted from the shaft 14 to the pulley set 12.

In order to indicate the amount of torque which is transmitted and indicating nut or washer member 52 is threaded on the end of the shaft extension 16 and anchored in position by means of a set screw 54. Indicating washer 52 advantageously includes spaced numerical indications around the periphery thereof and the torque control nut 48 advantageously includes a zero portion 48b permitting orientation of this portion with a selected number of the torque indicating washer. The torque adjusting washer 48 is advantageously made with a knurled surface to permit easy rotation and threading along the portion 16c for the purpose of increasing and decreasing the torque transmitted.

In FIGS. 8 and 9 an alternate shaft extension 16' without a squared portion is provided and a washer 46' is anchored for rotation with the shaft 16' by a pin 60 which extends through a bore defined in shaft 16'. The washer 46' is provided with suitable recesses 62 on each side of the shaft 16' to accommodate the pin 60 which prevents rotation of the washer around the shaft.

Hence it can be seen that the invention provides a very versatile transmission for tools and the like particularly for association with a pulley set. The mechanism is simple and compact and may be associated with a pulley set by incorporating the mechanism in the interior of such set. The control between driving through a gear set or directly driving from the power shaft to the pulleys may be easily effected. In addition, simple means are provided for adjusting the torque transmitted from the driving shaft to the pulley set so that this torque value will not be exceeded and the danger of destroying costly power tools is avoided.

While specific embodiments of the invention have been shown and described in detail to illustrate the application of the inventive principles, it will be understood that the invention may be embodied otherwise without departing from such principles.

What is claimed is:

1. A power transmission device comprising a pulley set having a plurality of pulleys of varying diameter with a larger pulley at one end ranging to a smaller one at an opposite end, the interior of said pulley being hollow, a shaft member centered within the interior of said pulley set, a gear affixed to said shaft member for rotation therewith, having external teeth, a plate member closing the end of said pulley set adjacent the largest diameter pulley and surrounding said shaft, means connecting said plate member to said pulley, a planetary gear rotatably mounted on said plate member and having teeth in meshing engagement with the teeth of said pinion gear, an internal annular gear member disposed within said hollow pulley set, including gear teeth in meshing engagement with said planetary gear teeth and further including a hub portion freely rotatable on said shaft located within said pulley set, said hub portion extending to the opposite smaller pulley end of said pulley set, and means at the smaller diameter end of said pulley set extending radially outwardly from said shaft for anchoring said internal annular gear against rotation to permit driving from said shaft to said pulley set.

2. A power transmission according to claim 1, wherein said shaft includes a portion extending outwardly through said plate, and control nut means threaded onto said shaft and displaceable on said threads to bear against said plate for varying the torque delivered from said shaft to said pulley set.

3. A power transmission according to claim 2, wherein said control nut means includes a friction washer on said shaft and an annular nut member threaded on said shaft and adapted to bear against said washer to force said washer against said plate.

4. A power transmission device according to claim 2, wherein said control nut means includes a friction washer on said shaft, means for rotation therewith, a nut member threaded on said shaft and engageable against said washer to cause said washer to be pressed against said plate, and an indicating nut on said shaft including indicia thereon for indicating a relative threading of said nut on said shaft for increasing and decreasing the torque transmitted by said shaft to said pulley set.

5. A power transmission according to claim 1, wherein said means to anchor said hub portion to prevent rotation of said annular gear includes a collar rotatable on said hub portion, and means carried by said collar and projecting outwardly therefrom for anchoring said collar to said shaft.

6. A power transmission according to claim 1, wherein said hub portion of said annular gear includes two separate elements with interengaging projecting and recessed portions.

7. A power transmission according to claim 1, wherein said shaft includes a hollowed end portion adapted to fit over the shaft of a driving motor.

8. A power transmission device for pulley sets and the like, comprising a pulley set, a shaft, a plate member freely mounted on said shaft for independent rotation therearound and connected to said pulley set, and adjustable friction means carried by said shaft for rotation therewith and being displaceable axially into frictional biasing engagement with said plate member for varying the power transmitted from said shaft to said plate member in adjustable amounts.

9. A power transmission device according to claim 8, wherein said adjustable friction means on said shaft includes a washer and means holding said washer on said shaft and preventing relative rotation of said washer around said shaft.

10. A power transmission device according to claim 9, wherein said means holding said washer on said shaft against rotation around said shaft includes a squared section of said shaft, said washer having a squared opening which fits over said squared section of said shaft.

11. A power transmission for pulley sets and the like, comprising a shaft, a pinion gear affixed to said shaft for rotation therewith, a plate member surrounding said shaft adapted to be connected to a driven member for transmitting power from said shaft, a planetary gear rotatably mounted on said plate member having teeth in meshing engagement with the teeth of said pinion gear, an internal annular gear member including gear teeth meshing with said planetary gear teeth and having a hub portion freely rotatable on said shaft, and means on said hub portion to anchor said annular gear member against rotation to permit driving from said shaft through said planetary gears, said means to anchor said annular gear member against rotation including a stop, a radially extending first bore in said annular gear hub portion, said shaft having a second bore in alignment with the first bore of said hub portion, and an anchoring nut carried by said hub portion in the first bore thereof adapted to be positioned in the second bore of said shaft to connect said hub portion with said shaft for direct drive and to be positioned out of the bore to position said nut for engagement by said stop and to hold said hub portion against rotation with said shaft for driving through said gears.

References Cited by the Examiner
UNITED STATES PATENTS

| | | | |
|---|---|---|---|
| 1,316,564 | 9/19 | Eisterhold | 74—785 |
| 2,294,951 | 9/42 | Baker | 64—30 |
| 2,517,875 | 8/50 | Henry | 74—785 |
| 3,049,029 | 8/62 | Schaning | 74—785 |

DON A. WAITE, *Primary Examiner.*